UNITED STATES PATENT OFFICE.

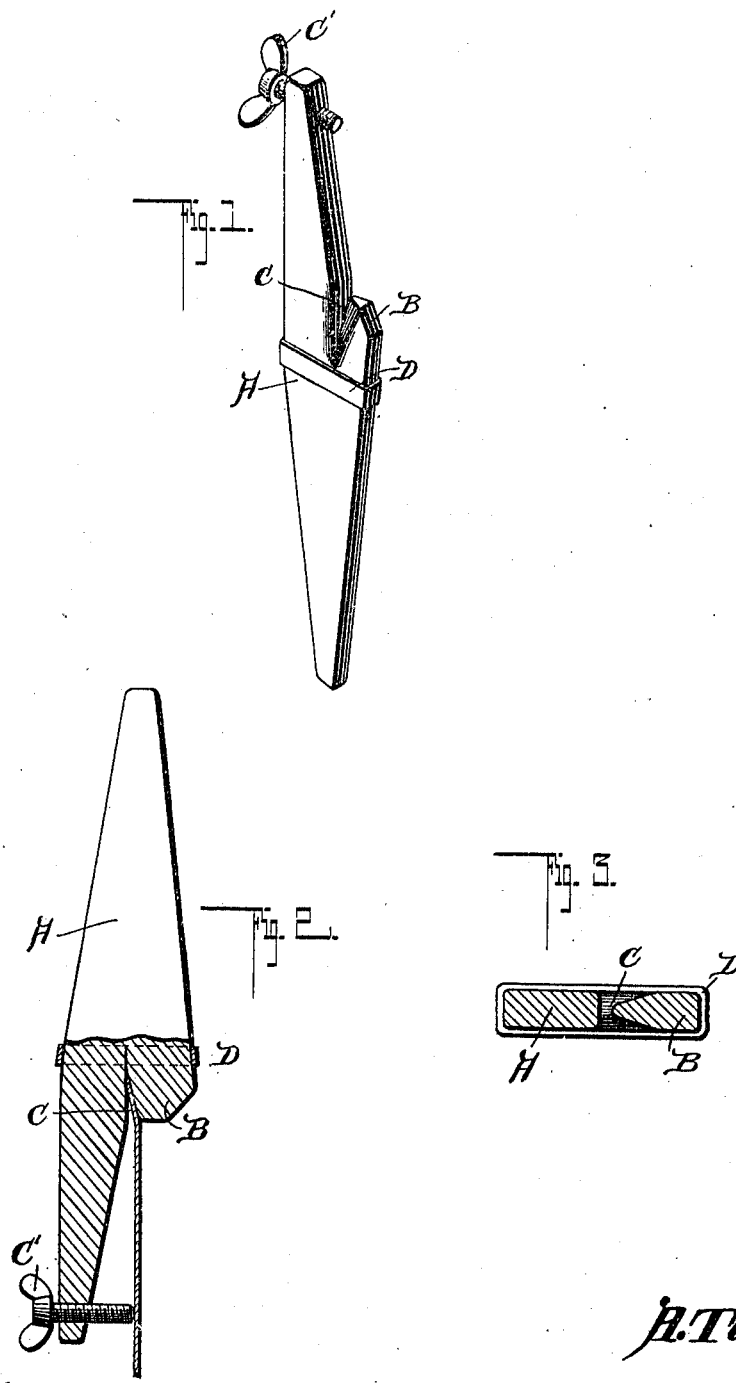

AUSTIN TILDEN, OF SHERIDAN, OREGON.

SAW-SET.

952,963.  Specification of Letters Patent.  Patented Mar. 22, 1910.

Application filed January 22, 1909. Serial No. 473,672.

*To all whom it may concern:*

Be it known that I, AUSTIN TILDEN, a citizen of the United States, residing at Sheridan, in the county of Yamhill and State of Oregon, have invented a new and Improved Saw-Set, of which the following is a specification.

This invention relates to saw-sets, the object being to provide a set which is exceedingly simple and cheap in construction and one which can be easily placed upon the saw so as to set the teeth at any angle desired.

A further object of the invention is to provide a set screw for regulating the pitch or set of the saw tooth.

A still further object of my invention is to provide a saw-set which can be used on a saw when arranged within the filing vise, thereby overcoming the difficulties now existing with sets of this character now in use, as it is necessary to remove the same in order to set the saw.

A further object of my invention is to provide a set which is so constructed that it can be used for setting hand-saws or power-saws.

With these objects in view the invention consists in the novel features of construction, and combination of parts, all of which will be fully described hereinafter.

In the drawings forming part of this specification—Figure 1 is a perspective view of my improved saw-set; Fig. 2 is a side elevation of the same showing it in position on a saw, the saw being shown in section, and Fig. 3 is a transverse section through the set.

In carrying out my improved invention, I employ a body A which is preferably formed of steel, cut away adjacent one end to form a shoulder B, the outwardly extending portion formed by the shoulder being beveled, as clearly shown, and the body provided with a slot C extending inwardly therefrom at a slight angle, the lower wall of the slot forming an anvil and the upper wall a punch, the sides of said punch being beveled so as to decrease the width of the same in order that it can be used upon either power or hand-saws.

The extension formed by the cut-away portion is provided with a threaded bore in which is mounted a set-screw C' for regulating the pitch or set of the saw tooth when placed in position upon the saw. The saw enters the slot and by screwing up, or unscrewing the set-screw, the angle of the tooth can be regulated and by giving the upper end of the body a tap with a hammer the tooth will be forced over so as to give it the desired pitch. It will be seen by this arrangement that I have provided a saw-set which can be placed upon a saw quickly and the tooth set to the angle desired, by simply striking the set with a hammer, it, of course, being understood that the set-screw has been adjusted to the proper position so as to give the tooth the proper pitch. For preventing the body from spreading in any way I surround the same with a band D of any suitable metal which is held thereon by frictional contact, the said band serving the purpose of holding the slot which extends into the body substantially closed.

Having thus described my invention what I claim as new and desire to secure by Letters Patent is—

As a new article of manufacture, a saw set comprising a steel body cut away upon one side adjacent one end to form a shoulder, the face of the outwardly projecting portion being beveled, a slot extending inwardly from the shoulder at an angle to the beveled portion, adapted to receive the saw, a band secured around said body at the end of the slot, one wall of said slot forming an anvil and the other a punch, said punch being reduced by beveling its sides and a bore formed in the extension formed by the cut away portion having a screw mounted therein, for regulating the pitch of the teeth of the saw.

AUSTIN TILDEN.

Witnesses:
 F. M. SIMPSON,
 O. CRAFT.